United States Patent [19]

Glew et al.

[11] Patent Number: 4,626,131
[45] Date of Patent: Dec. 2, 1986

[54] UNDERGROUND LIQUID STORAGE SYSTEM AND METHOD

[75] Inventors: David N. Glew; John S. McIntyre, both of Sarnia; Jeffrey F. Gilbert, deceased, late of Sarnia, all of Canada, by Enid R. Gilbert, executrix

[73] Assignee: The Dow Chemical Company, Midland, Mich.

[21] Appl. No.: 808,903

[22] Filed: Dec. 13, 1985

[51] Int. Cl.$^4$ .......................... B65G 5/00; B65G 65/30
[52] U.S. Cl. ........................................ 405/59; 405/53; 405/58; 137/154
[58] Field of Search .................... 405/52–59, 405/128; 166/305.1; 261/18 R; 137/154

[56] References Cited

U.S. PATENT DOCUMENTS

| | | | |
|---|---|---|---|
| 2,787,455 | 4/1957 | Knappen | 262/3 |
| 2,942,424 | 6/1960 | Koble | 405/59 |
| 2,986,007 | 5/1961 | Shook | 61/5 |
| 3,136,325 | 6/1964 | Mattix | 137/154 X |
| 3,151,462 | 10/1964 | Raetzsch | 61/5 |
| 3,277,654 | 10/1966 | Shiver | 405/59 X |
| 3,355,893 | 12/1967 | Kuhne | 405/59 X |
| 3,491,540 | 1/1970 | Lennemann | 61/5 |
| 3,745,770 | 7/1973 | Fraser et al. | 61/5 |
| 3,887,462 | 6/1975 | LeGess et al. | 210/53 |
| 3,922,863 | 12/1975 | Shock et al. | 61/5 |
| 4,251,361 | 2/1981 | Grimsley | 210/703 |

FOREIGN PATENT DOCUMENTS

| | | | |
|---|---|---|---|
| 610827 | 12/1960 | Canada | 405/59 |
| 7406904 | 12/1974 | Netherlands | 405/59 |

Primary Examiner—Dennis L. Taylor
Assistant Examiner—Nancy J. Stodola
Attorney, Agent, or Firm—M. W. Barrow

[57] ABSTRACT

A storage system and method for storing a valuable liquid in a subterranean cavity with a displacing liquid such as brine. The valuable liquid, which normally has a density above or about that of the displacing liquid, is modified by dissolving therein small amounts of a light fluid such as alkanes and alkenes of up to 4 carbon atoms, hydrogen, nitrogen, carbon monoxide or combinations thereof. The amount of the light fluid dissolved in the stored liquid is sufficient to maintain the density of this phase below that of the displacing liquid so that the valuable liquid is stored over the displacing liquid.

20 Claims, 3 Drawing Figures

UNDERGROUND LIQUID STORAGE SYSTEM AND METHOD

FIELD OF THE INVENTION

This invention relates to the underground storage of liquids in subterranean cavities in which a displacing liquid is employed, and particularly to such storage in which the liquid to be stored has a specific gravity or density above or about that of the displacing liquid at the storage conditions.

BACKGROUND OF THE INVENTION

The storage of valuable liquids in naturally occurring or solution-mined subterranean cavities was very well known. Typically, the cavity held in separate phases the valuable liquid and an immiscible displacing liquid, such as saturated brine, to entirely fill the cavity. When it was desired to introduce additional valuable liquid into the cavity, a corresponding volume of brine was simultaneously withdrawn. Conversely, when it was desired to withdraw valuable liquid from the cavity, it was displaced therefrom with a corresponding volume of brine introduced simultaneously into the cavity.

Depending on the density of the valuable liquid relative to the displacing liquid, the valuable liquid was disposed either over or under the displacing liquid, as described in U.S. Pat. No. 3,491,540.

For example, U.S. Pat. No. 3,745,770 described the storage of ethylene dichloride under brine, and U.S. Pat. Nos. 2,986,007 and 2,787,455 described the storage over brine of liquified petroleum gas or another light fluid which gasified on release of pressure. However, because of permanent losses associated with the rubble pile and other discontinuities at the bottom of the cavity, it was generally desirable to store the valuable liquid above the brine or other displacing liquid.

Such storage systems and methods were generally acceptable (except for permanent losses associated with storage under brine as previously noted) when the differences between the densities of the brine and the valuable liquid at the storage conditions was substantial.

Because of the risk of phase inversion, however, such storage of liquids having a density close to that of the brine at the storage conditions was impractical. For example, a liquid such as ethylene dichloride is more dense than saturated brine at ambient conditions, and also at slightly elevated temperatures, such as those occurring in cavities relatively close to the earth surface, and it has been conveniently stored under brine in shallow, low temperature cavities. However, at higher temperatures which generally occur in deeper cavities, the ethylene dichloride may have a density less than or about the same as the saturated brine, resulting in phase inversion, or in dispersion of ethylene dichloride droplets into the brine phase or vice versa. Moreover, the temperature in such cavities is seldom uniform, generally being lower at the top than at the bottom of the cavity. Liquid near the bottom of the cavity would be heated and would rise, due its decreased density, into the cooler liquid in the upper portion until it cooled sufficiently to be more dense than the liquid in the upper portion, whereupon it would begin falling and descend into the lower portion to repeat the cycle.

One attempt to solve the problem of the risk of phase inversion has been the use of a displacing fluid other than brine. In cavities mined in salt domes or spires, fresh water could not be used because it would eventually saturate by dissolution of minerals from the roof and walls of the cavity. On the other hand, organic liquids were generally too expensive to be practically considered.

Another attempt has been the modification of the stored material to increase its density so that the stored material would be disposed beneath the brine. This approach has been successful in the case of solids, such as, for example, the weighting of asbestos fibers with particulate material as described in U.S. Pat. No. 3,887,462, and in the case of a heavy condensable gas, such as, for example, chlorine compressed to maintain it in liquid form by the hydrostatic pressure of the brine disposed thereabove as described in U.S. Pat. No. 3,151,462. Heretofore, no such modification of valuable liquids to be stored in subterranean cavities with brine has been known.

SUMMARY OF THE INVENTION

The present invention provides a storage system and method for storing liquids in subterranean cavities with a displacing liquid in which the liquid to be stored, normally having a density above or about that of the displacing liquid at the storage conditions, has been modified to ensure that it is lighter than the displacing liquid and will therefore be disposed thereabove.

Briefly, the liquid storage system includes a subterranean cavity, a dense liquid displacing phase disposed in the lower portion of the cavity, and a light liquid phase disposed above the dense phase in the cavity. The light phase includes a stored liquid normally having a density above or about that of the displacing liquid, and dissolved therein, a sufficient quantity of a light fluid to maintain the density of the light phase at least about 1 kg/m$^3$ below that of the displacing liquid to prevent phase inversion and dispersion.

The invention is also a method of storing a liquid in a subterranean cavity with an immiscible displacing fluid which normally has a density below or about that of the liquid to be stored. The method includes the steps of: (a) placing the displacing liquid in the subterranean cavity; (b) dissolving a light fluid in the liquid to be stored in an amount sufficient to form a light liquid phase having a density at least about 1 kg/m$^3$ less than that of the displacing liquid at the storage conditions to prevent phase inversion and dispersion therewith; (c) placing the light liquid phase in the subterranean cavity, the displacing liquid being disposed in a lower portion thereof and the light liquid in an upper portion; and (d) maintaining in the light liquid phase in the cavity the sufficient amount of the light fluid dissolved therein to prevent phase inversion and dispersion with the displacing liquid.

DESCRIPTION OF THE PREFERRED EMBODIMENTS

Figure 1:
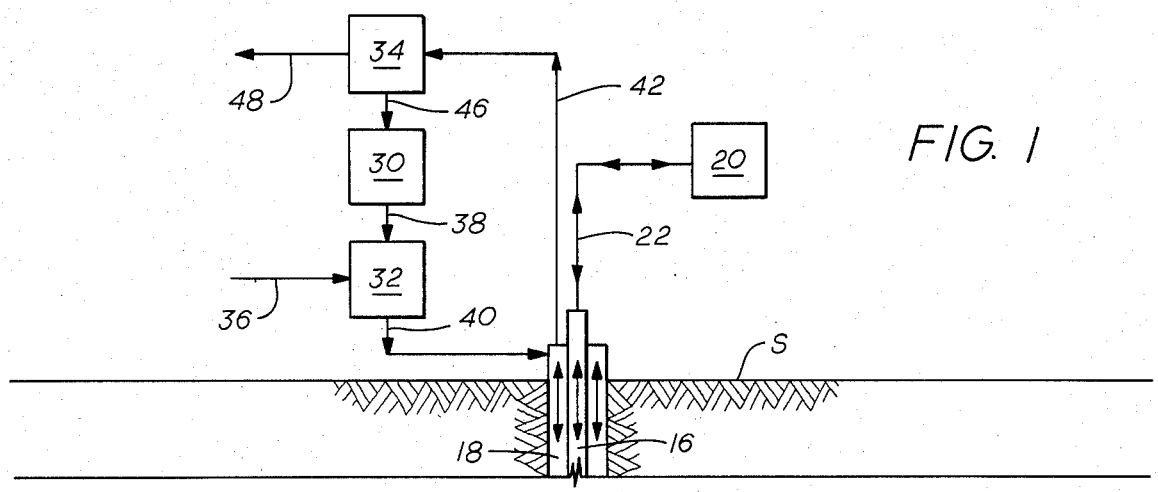
FIG. 1 illustrates, partly in section and partly in schematic form, a liquid storage system according to the present invention.
Figure 1:
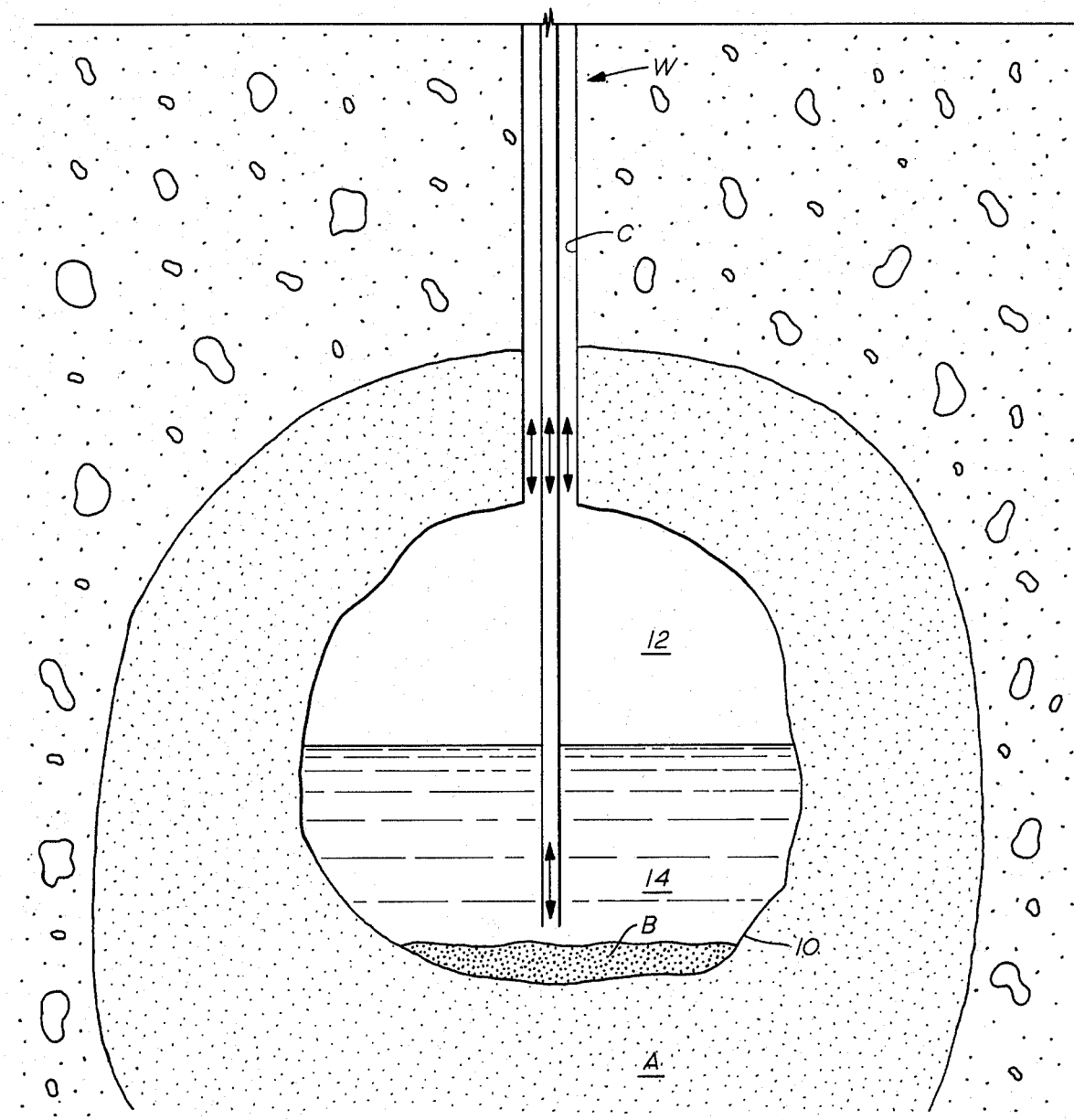

The primary elements of the storage system are a subterranean cavity, a light liquid phase disposed in the upper portion of the cavity and containing the valuable stored liquid and light fluid dissolved therein, and a dense phase of displacing liquid disposed in the lower portion of the cavity.

The subterranean cavity may be a naturally occurring cavern or a cavity formed by the solution mining of underground mineral deposits such as in salt domes or spires. The cavity should not contain any fractures or be located in permeable formations in order to avoid loss of liquid from the cavity into the surrounding formation and contamination by fluid seepage from the surrounding formation into the cavity.

The subterranean cavity is preferably a solution-mined cavity formed in a salt dome or spire. Such cavities are more amenable to use in the storage system and method of the present invention because they are impermeable, are more readily formed with desirable shapes during the course of the solution mining, and the well or wells employed in the mining operation are readily adapted for use in the present invention. The rubble pile typically present on the bottom of the cavity after the solution mining process will not result in loss of any of the valuable liquid stored in the cavity because the valuable liquid is always contained in the upper layer of the storage system. Generally, the depth of the cavity below the surface is not critical, but as explained hereinbelow, the higher the temperature of the cavity (which is generally proportional to depth), generally the less light fluid needed to modify the density of the stored liquid. The densities of the light liquid phase and the displacing liquid are also increased by hydrostatic pressure in the cavity.

The displacing liquid is preferably saturated brine because of its low cost and ready availability. Fresh water is generally not suitable when the cavity is formed in water soluble formations such as salt domes or spires. Although less desirable because of the relatively high cost, another liquid may be used as the displacing liquid if it is immiscible with the liquid to be stored and if the light fluid to be dissolved in the liquid to be stored is not substantially soluble in the displacing liquid or is preferentially soluble in the liquid to be stored. If the displacing liquid is not brine, it should also have a reasonably high density so that excessive amounts of the light fluid are not required to be dissolved in the stored liquid to modify its density to be less than that of the displacing liquid. For convenience, the displacing liquid is hereinafter referred to as brine with the understanding that other displacing liquids are also contemplated as being within the scope of the invention.

Virtually any valuable liquid desired to be stored in a subterranean cavity, which is substantially immiscible with the brine, can be so stored with the system and method of the present invention, but there will generally be no advantage in doing so unless the density of the liquid to be stored is normally greater than or about that of the brine at contemplated storage conditions. When saturated brine is employed as the displacing liquid, the invention is particularly attractive for storing relatively heavy liquids such as halogenated hydrocarbons, carbon disulfide, and the like.

Representative specific examples of halogenated hydrocarbon liquids contemplated for storage with saturated brine include: amyl iodide, benzotrichloride, bromobenzene, bromotoluene, butyl bromide, butyl iodide, carbon tetrachloride, chloro-aniline, chloroform, cyclohexyl bromide, dibromo-benzene, dichloro-benzene, ethylene dichloride, ethyl bromide, ethyl iodide, ethylene bromide, ethylene chlorobromide, fluoro-trichloromethane, iodo-benzene, methylene bromide, methylene chloride, penta-chloroethane, propyl bromide, propylene bromide, tetrachloroethane, tetrachloroethylene, trichlorobenzene, trichloroethane, trichloroethylene, trifluorotrichloroethane, trimethylene bromide, and the like.

A light fluid is dissolved in the stored liquid in an amount sufficient to modify the density so that the light liquid phase has a lower density than the displacing phase at the storage conditions. The density of the light liquid phase is preferably at least about 1 $kg/m^3$ lower than that of the displacing liquid to ensure that there is a sufficient density difference to avoid phase inversion or dispersion. Preferably, the dissolved fluid is preferentially soluble in the liquid to be stored and substantially insoluble in the brine. The dissolved fluid is also preferably readily separable from the stored liquid, such as, for example, by flash distillation.

The fluid dissolved may be a light liquid, but is preferably a gas such as hydrogen, nitrogen, carbon monoxide, alkanes or alkenes having up to about 4 carbon atoms, or the like, or a combination of such gases. When brine is the displacing fluid and the stored liquid is a halogenated hydrocarbon, such gases can effectively modify the density of the halogenated hydrocarbon phase at a relatively low weight fraction, and can be readily dissolved in and separated from the stored liquid.

With reference to FIG. 1, the storage system illustrated includes cavity 10 formed in salt dome or spire A with rubble pile B located at the bottom thereof. The brine is disposed as lower phase 14 beneath light phase 12 which contains the immiscible valuable stored liquid and the light fluid dissolved therein. For convenience, the valuable stored liquid is hereinafter referred to as ethylene dichloride and the light fluid dissolved therein as ethylene, with the understanding that other valuable liquids and light fluids are also contemplated as being within the scope of the invention.

The storage system is preferably filled with liquid so that suitable means may be employed for simultaneously introducing the density-modified ethylene dichloride into light phase 12 and withdrawing an equal volume of the brine from lower phase 14 when it is desired to store additional ethylene dichloride, and for simultaneously withdrawing the ethylene dichloride from light phase 12 and introducing an equal volume of brine into lower phase 14 when it is desired to recover ethylene dichloride. For example, such means may include well W in communication with cavity 10 and having outer casing C and inner tubing 16. Brine is introduced into and withdrawn from lower phase 14 through inner tubing 16 completed near the bottom of cavity 10, preferably at the lowermost point thereof but above rubble pile B. Ethylene dichloride containing dissolved ethylene is introduced into and withdrawn from light phase 12 through annulus 18 formed between outer casing C, completed near the top of cavity 10, and inner tubing 16. Preferably, well W is the well used in the solution-mining process. Alternatively, more than one well may be used.

The storage system shown is also provided with brine source and storage 20 from which the brine is supplied and to which the brine is returned through line 22 in communication with source 20 and inner tubing 16. Such source and storage means are conventional in the art. Generally, cavity 10 and well W are initially filled with the brine prior to storage of the ethylene dichloride.

The storage system is further provided with ethylene supply/return 30, ethylene-ethylene dichloride mixing means 32, and ethylene-ethylene dichloride separating means 34. In this embodiment, the ethylene dichloride to be stored is fed through line 36 to mixing means 32, to which is also supplied through line 38 the ethylene to be dissolved therein. Mixing means 32 is preferably an inline mixer but may also be a packed absorption tower, agitated vessel, or other suitable means for dissolving the ethylene in the ethylene dichloride to be stored before the solution is transferred through line 40 and annulus 18 and introduced into light phase 12 of cavity 10. If the ethylene is not dissolved in the ethylene dichloride to be stored before it is introduced into cavity 10, phase inversion or dispersion may occur before a sufficient amount of the ethylene dissolves in the ethylene dichloride. Also, when initially placing ethylene dichloride in cavity 10, there should be an excess of ethylene dissolved therein sufficient to offset any losses from solubility of the ethylene in the brine.

Figure 2:
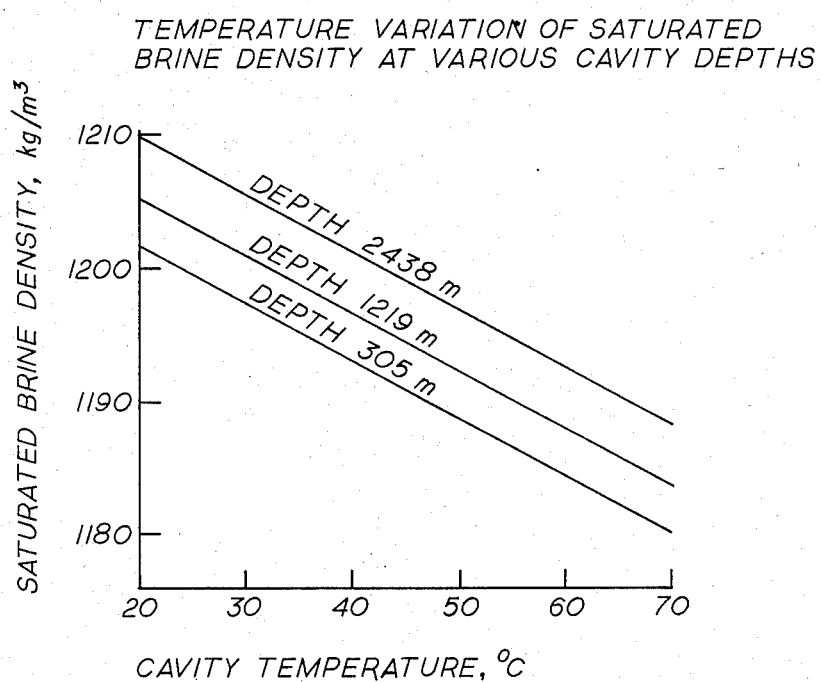
FIG. 2 graphically illustrates the density, as a function of temperature, of saturated brine for various cavity depths.
Figure 3:
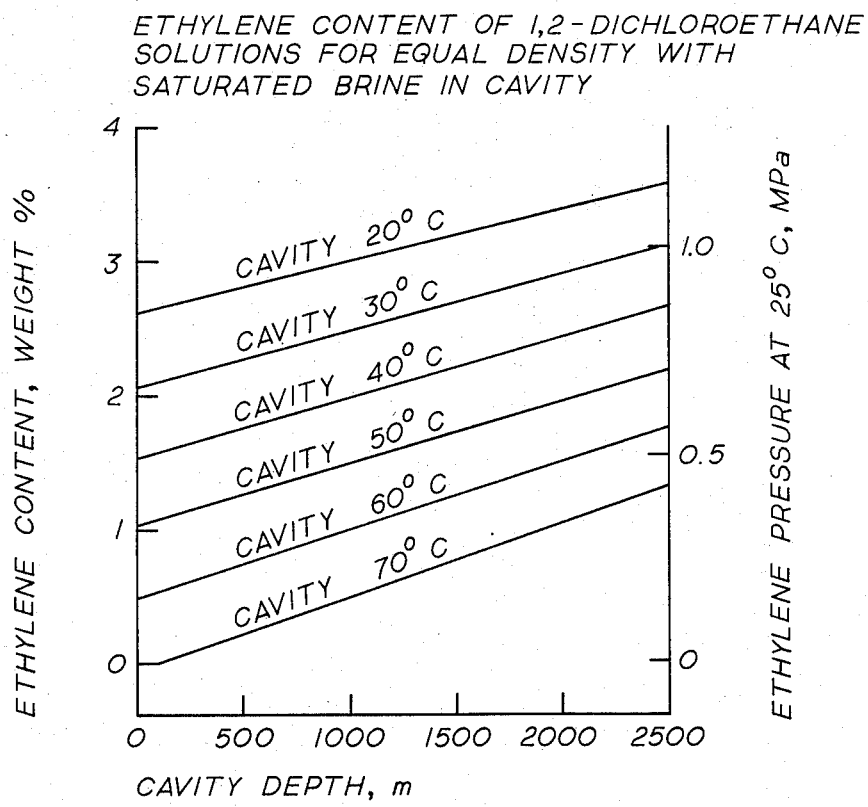
FIG. 3 graphically illustrates the ethylene weight percent (left-hand ordinate) and the surface ethylene pressure at 25° C. (right-hand ordinate), as a function of the cavity depth, required to obtain an ethylene-ethylene dichloride solution with a density equal to that of saturated brine at various cavity temperatures.

Determining the amount of ethylene to be dissolved in the ethylene dichloride is readily determined by known techniques. For example, saturated brine density at the contemplated cavity temperature and depth is readily determined from reported values or calculated from known empirical equations. For convenience, such data is graphically presented in FIG. 2 for cavity temperatures in the range of 20°-70° C. and depths of 305 m, 1219 m and 2438 m. Standard laboratory and/or empirical techniques are then employed to determine the amount of ethylene to be dissolved in the ethylene dichloride to obtain a solution with the same density as the brine at the contemplated storage conditions, and also to determine the ethylene pressure required to dissolve the necessary amount of ethylene in the ethylene dichloride before placing the solution in the cavity. Such data are presented graphically in FIG. 3 as a function of cavity depth at various cavity temperatures ranging from 20° C. to 70° C. In FIG. 3, the left-hand ordinate is used to obtain the percent by weight of ethylene required to obtain an ethylene dichloride solution equal in density to that of the brine; the right-hand ordinate is used to obtain the ethylene pressure required to obtain the indicated weight percent of ethylene at the surface, i.e. at 25° C. with no hydrostatic pressure.

Preferably, the weight percent ethylene in the ethylene dichloride solution is at least about 0.1 in excess of that required to obtain a light phase having a density equal to the brine phase in order to ensure that no phase inversion or dispersion will occur, i.e. a sufficient excess of ethylene so that the density of the light phase is at least about 1 kg/m$^3$ less than that of the brine phase at the storage conditions. The excess pressure of the ethylene required to obtain this excess weight percent ethylene is about 0.07 MPa at 25° C., but more pressure may be used if desired. Although the ethylene pressure and content in the light phase may be considerably higher if desired, the content of ethylene in the light phase is preferably up to about 3 percent by weight of the light phase, the solution being obtained in the mixing means with an ethylene pressure preferably up to about 1.0 MPa.

When it is desired to withdraw ethylene dichloride from cavity 10 in FIG. 1, liquid from light phase 12 is removed from cavity 10 through annulus 18 and line 42 and fed to separating means 34 which may be a flash distillation unit, stripper or other means suitable for separating the ethylene dichloride from the ethylene dissolved therein. Substantially purified ethylene dichloride is obtained in line 48, while the ethylene removed therefrom is returned to ethylene supply/return 30 through line 46. Alternatively, it may be acceptable or desirable to transport the ethylene dichloride with the ethylene dissolved therein, obviating the need for separating means 34. Still another alternative contemplated is that mixing means 32 and separating means 34 may be combined as one unit for both of these functions.

The invention is further explained by way of the examples which follow:

EXAMPLE 1

A solution mined cavity with a depth of about 457 m and a temperature of about 25° C. is filled with saturated brine. Ethylene at 0.86 MPa and liquid ethylene dichloride are equilibrated in a surface vessel at a temperature of 25° C. to form a solution containing about 2.6 wt. % ethylene. This solution is then introduced into the cavity as the upper phase with an equal volume of brine being removed simultaneously. This upper phase has a density of 1199 kg/m$^3$ at 5.48 MPa and 25° C. and floats on the more dense lower phase saturated brine layer which has a density of 1200 kg/m$^3$ under these conditions.

EXAMPLE 2

Ethylene-ethylene dichloride solution and saturated brine are placed in a solution-mined cavity as in Example 1. The cavity is at a depth of about 457 m but at a temperature of about 35° C. Ethylene at 0.69 MPa and liquid ethylene dichloride are equilibrated in a surface vessel at a temperature of 25° C. to form a solution containing about 2.1 wt. % ethylene. This solution is then introduced into the cavity as the upper phase which has a density of 1195 kg/m$^3$ at 5.46 MPa and 35° C. and floats on the saturated brine layer which has a density of 1196 kg/m$^3$ under these conditions.

EXAMPLE 3

Ethylene-ethylene dichloride solution and saturated brine are placed in a solution-mined cavity as in Example 1. The cavity is at a depth of about 1829 m and has a temperature of about 50° C. Ethylene at 0.66 MPa and liquid ethylene dichloride are equilibrated in a surface vessel at a temperature of 25° C. to form a solution containing about 1.95 wt. % ethylene. This solution is then introduced into the cavity as the upper phase which has a density of 1193 kg/m$^3$ at 21.44 MPa and 50° C. and floats on the saturated brine layer which has a density of 1194 kg/m$^3$ under these conditions.

EXAMPLE 4

Ethylene-ethylene dichloride solution and saturated brine are placed in a solution-mined cavity as in Example 1. The cavity is at a depth of about 1829 m but at a temperature of about 60° C. Ethylene at 0.50 MPa and liquid ethylene dichloride are equilibrated in a surface vessel at a temperature of 25° C. to form a solution containing about 1.5 wt. % ethylene. This solution is then introduced into the cavity as the upper phase which has a density of 1189 kg/m³ at 21.37 MPa and 60° C. and floats on the saturated brine layer which has a density of 1190 kg/m³ under these conditions.

The foregoing disclosure and description of the invention are illustrative and explanatory thereof, and various changes in the size, shape and materials, as well as in the details of the illustrated system and method may be made without departing from the spirit of the invention.

We claim:

1. A liquid storage system, comprising:
   (a) a subterranean cavity;
   (b) a dense liquid displacing phase disposed in the lower portion of said cavity; and
   (c) a light liquid phase disposed above said dense phase in said cavity, said light liquid phase including a stored liquid which normally has a density above or about that of said displacing phase, and dissolved in said stored liquid, a light fluid in a sufficient amount to maintain the density of said light liquid phase at least about 1 kg/m³ below that of said displacing phase to prevent phase inversion and dispersion therewith.

2. The storage system of claim 1, wherein said displacing phase is brine.

3. The storage system of claim 1, wherein said stored liquid is selected from the group consisting of: halogenated hydrocarbons and carbon disulfide.

4. The storage system of claim 1, wherein said light fluid is a gas selected from the group consisting of: alkanes and alkenes having up to about 4 carbon atoms, hydrogen, nitrogen, carbon monoxide, and combinations thereof.

5. A liquid storage system, comprising:
   (a) a subterranean cavity;
   (b) brine disposed in the lower portion of said cavity;
   (c) halogenated hydrocarbon liquid, normally having a density above or about that of said brine, disposed as a light liquid phase in said cavity above said brine; and
   (d) gas dissolved in said halogenated hydrocarbon in an amount sufficient to maintain the density of said halogenated hydrocarbon phase at least about 1 kg/m³ below the density of said brine to prevent phase inversion and dispersion therewith, said gas selected from the group consisting of: alkanes and alkenes having up to about 4 carbon atoms, hydrogen, nitrogen, carbon monoxide, and combinations thereof.

6. The storage system of claim 5, wherein said cavity is a solution-mined cavity.

7. The storage system of claim 5, wherein said storage system further comprises means for introducing additional halogenated hydrocarbon and gas dissolved therein into said halogenated hydrocarbon phase and simultaneously removing an equal volume of brine from said brine phase, and for removing halogenated hydrocarbon and gas dissolved therein from said halogenated hydrocarbon phase and simultaneously adding an equal volume of brine to said brine phase.

8. The storage system of claim 5, wherein said halogenated hydrocarbon is selected from the group consisting of: amyl iodide, benzotrichloride, bromobenzene, bromotoluene, butyl bromide, butyl iodide, carbon tetrachloride, chloro-aniline, chloroform, cyclohexyl bromide, dibromo-benzene, dichloro-benzene, ethylene dichloride, ethyl bromide, ethyl iodide, ethylene bromide, ethylene chlorobromide, fluoro-trichloromethane, iodo-benzene, methylene bromide, methylene chloride, penta-chloroethane, propyl bromide, propylene bromide, tetrachloroethane, tetrachloroethylene, trichlorobenzene, trichloroethane, trichloroethylene, trifluorotrichloro-ethane, and trimethylene bromide.

9. The storage system of claim 5, wherein said halogenated hydrocarbon liquid is ethylene dichloride and said gas is ethylene.

10. The storage system of claim 9, wherein said ethylene is present in said halogenated hydrocarbon liquid in an amount up to about 3 percent by weight of said light liquid phase.

11. A method of storing a liquid in a subterranean cavity with an immiscible displacing liquid, comprising the steps of:
    (a) placing a displacing liquid in a subterranean cavity;
    (b) dissolving a light fluid in a liquid to be stored in said cavity, said liquid to be stored being immiscible with said displacing liquid and normally having a density above or about that of said displacing liquid, said light fluid being dissolved in said liquid to be stored in an amount sufficient to form a light liquid phase having a density at least about 1 kg/m³ less than that of said displacing liquid to prevent phase inversion and dispersion therewith;
    (c) placing said light liquid phase in said cavity, said displacing liquid being disposed in a lower portion thereof and said light liquid phase in an upper portion thereof; and
    (d) maintaining in said light liquid phase in said upper portion of said cavity said sufficient amount of said light fluid dissolved therein to prevent phase inversion and dispersion with said displacing liquid.

12. The method of claim 11, wherein said displacing liquid is brine.

13. The method of claim 11, wherein said subterranean cavity is a solution-mined cavity.

14. The method of claim 11, wherein said liquid to be stored is selected from the groups consisting of halogenated hydrocarbons and carbon disulfide.

15. The method of claim 11, wherein said light fluid is gas selected from the group consisting of: alkanes and alkenes having up to about 4 carbon atoms, hydrogen, nitrogen, carbon monoxide, and combinations thereof.

16. The method of claim 11, further comprising the step of:
    (e) withdrawing at least a portion of said light liquid phase from said upper portion of said cavity while simultaneously placing in said lower portion of said cavity an additional volume of said displacing liquid equivalent to that withdrawn from said light liquid phase.

17. A method of storing halogenated hydrocarbon liquid in a subterranean cavity with brine, comprising the steps of:
    (a) filling a solution-mined subterranean cavity with liquid including brine;
    (b) dissolving gas in liquid halogenated hydrocarbon to be stored in an amount sufficient to form a light liquid phase having a density at least 1 kg/m³ less than that of said brine at the pressure and temperature in said cavity to prevent phase inversion and dispersion therewith, said halogenated hydrocarbon being immiscible with said brine and normally having a density above or about that of said brine, said gas selected from the group consisting of: alkanes and alkenes having up to about 4 carbon atoms, hydrogen, nitrogen, carbon monoxide, and combinations thereof;
(c) placing said light liquid phase in said cavity, said brine being disposed in a lower portion thereof and said light liquid phase in an upper portion;
(d) maintaining in said light liquid phase in said cavity said sufficient amount of said gas dissolved in said phase to prevent phase inversion and dispersion; and
(e) withdrawing at least a portion of said light liquid phase from said cavity while simultaneously placing in said cavity an additional volume of said brine equivalent to that of said withdrawn light liquid phase.

18. The method of claim 17, wherein said halogenated hydrocarbon is selected from the group consisting of: amyl iodide, benzotrichloride, bromobenzene, bromotoluene, butyl bromide, butyl iodide, carbon tetrachloride, chloro-aniline, chloroform, cyclohexyl bromide, dibromo-benzene, dichloro-benzene, ethylene dichloride, ethyl bromide, ethyl iodide, ethylene bromide, ethylene chlorobromide, fluoro-trichloromethane, iodo-benzene, methylene bromide, methylene chloride, penta-chloroethane, propyl bromide, propylene bromide, tetrachloroethane, tetrachloroethylene, trichlorobenzene, trichloroethane, trichloroethylene, trifluorotrichloro-ethane, and trimethylene bromide.

19. The method of claim 17, wherein said halogenated hydrocarbon is ethylene dichloride, said gas is ethylene, and said ethylene is present in said light liquid phase in an amount up to about 3 percent by weight of said light liquid phase.

20. The method of claim 17, further comprising the step of:
(f) substantially separating said gas from said withdrawn light liquid phase.

* * * * *